(12) United States Patent
Hayashi et al.

(10) Patent No.: US 6,852,936 B2
(45) Date of Patent: Feb. 8, 2005

(54) SWITCH STRUCTURE OF STEERING WHEEL

(75) Inventors: Seiji Hayashi, Aichi-ken (JP); Kenichi Jinushi, Komaki (JP); Hiroyuki Kato, Nisshin (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 500 days.

(21) Appl. No.: 09/734,912

(22) Filed: Dec. 13, 2000

(65) Prior Publication Data

US 2002/0057150 A1 May 16, 2002

(30) Foreign Application Priority Data

Dec. 15, 1999 (JP) ............................................ 11-355593

(51) Int. Cl.[7] ................................................ H01H 9/00
(52) U.S. Cl. .................................. 200/61.54; 200/61.57
(58) Field of Search ................... 200/339, 61.54–61.57; 333/78, 180; 180/333, 78

(56) References Cited

U.S. PATENT DOCUMENTS

| 5,756,950 A | * | 5/1998 | De Filippo | 200/61.54 |
| 6,013,884 A | * | 1/2000 | Rudolph et al. | 200/295 |
| 6,525,283 B2 | * | 2/2003 | Leng | 200/339 |

* cited by examiner

Primary Examiner—Lincoln Donovan
(74) Attorney, Agent, or Firm—Nixon Peabody LLP

(57) ABSTRACT

In order to obtain a switch structure of a steering wheel in which a number of kinds of parts can be reduced and cost can be greatly reduced, there is provided a switch structure of a steering wheel at which a pair of opening portions symmetrically formed between an inner periphery of a rim of the steering wheel and an outer periphery of a pad cover as seen from a vehicle occupant side, at each of which opening portions a switch assembly formed by a plurality of switches is disposed, wherein arrangement and shape of the plurality of switches constituting the each switch assembly are determined so as to be symmetrical with respect to a predetermined base line intersecting the respective opening portions.

5 Claims, 13 Drawing Sheets

SWITCH STRUCTURE OF STEERING WHEEL

BACKGROUND OF THE INVENTION

1. Field of the Invention

The present invention relates to a switch structure of a steering wheel employed in a case when a switch assembly constituted by a plurality of switches is arranged at each of positions capable of being operated through a pair of opening portions formed in a laterally symmetrical shape between an inner peripheral edge of a rim of a steering wheel and an outer peripheral edge of a pad cover as seen from vehicle occupant side.

2. Description of the Related Art

In general, indispensable switches such as a horn switch and the like are arranged in a steering wheel, however, in response to consumer's needs in recent years, switches having value added such as a switch for an audio device, a switch for a car navigation system and the like are being arranged in the steering wheel. For example, in the case of a steering wheel of a four-spoke type, the switches having value added mentioned above are placed by using a pair of right and left opening portions formed between the inner peripheral edge of the rim of the steering wheel and the outer peripheral edge of the pad cover.

However, in the conventional art, in the case that subjects to be operated by the switches are different from each other, an arrangement and a shape of the switch placed in the left opening portion of the pad cover and an arrangement and a shape of the switch placed in the right opening portion of the pad cover are different from each other. Accordingly, it is necessary to prepare respective metal molds and substrates having different shapes for the switch placed in the left side and the switch placed in the right side, thereby causing an increase of cost.

SUMMARY OF THE INVENTION

The present invention takes the facts mentioned above into consideration and an object of the present invention is to provide a switch structure of a steering wheel in which a number of types of parts are reduced and cost are significantly reduced.

In accordance with a first aspect of the present invention, there is provided a switch structure of a steering wheel at which a pair of opening portions are symmetrically formed between an inner periphery of a rim of the steering wheel and an outer periphery of a pad cover of the steering wheel as seen from a vehicle occupant side, at each of the opening portions a switch assembly constituted by a plurality of switches is disposed, wherein an arrangement and a shape of the plurality of switches constituting the each switch assembly are determined so as to be symmetrical with respect to a predetermined base line intersecting the each of the opening portions (the respective opening portions).

In accordance with a second aspect of the present invention, there is provided a switch structure of a steering wheel according to the first aspect, wherein the switch assembly is fixed to a component that is one of steering wheel side constituting parts.

In accordance with a third aspect of the present invention, there is provided a switch structure of a steering wheel according to the first aspect, wherein the switch assembly is fixed to a component that is one of pad cover side constituting parts.

In accordance with a fourth aspect of the present invention, there is provided a switch structure of a steering wheel according to the first aspect, wherein the predetermined base line passes through a center of the steering wheel.

In accordance with a fifth aspect of the present invention, there is provided a switch structure of a steering wheel at which opening portions formed between an inner periphery of a rim of the steering wheel and an outer periphery of a pad cover as seen from a vehicle occupant side, at each of which opening portions a switch assembly constituted by a plurality of switches is disposed, wherein arrangement of the plurality of switches is the same at each switch assembly, and a switch disposed at corresponding portion of each switch assembly has the same shape at each switch assembly.

In accordance with a sixth aspect of the present invention, there is provided a switch structure of a steering wheel according to the fifth aspect, comprising: a first opening portion and a second opening portion formed between the inner periphery of the rim of the steering wheel and the outer periphery of the pad cover as seen from the vehicle occupant; a first switch assembly constituted by a plurality of switches disposed in the first opening portion; and a second switch assembly constituted by a plurality of switches disposed in the second opening portion, wherein an arrangement of the plurality of switches of the first switch assembly is the same as an arrangement of the plurality of switches of the second switch assembly, and each switch of the plurality of switches of the first switch assembly has a shape the same as a shape of a switch of the plurality of switches of the second switch assembly which switch corresponds to the each switch of the plurality of switches of the first switch assembly.

In accordance with the first aspect of the present invention, a pair of opening portions are formed so as to be (laterally) symmetrical between the inner periphery of the rim of the steering wheel and the outer periphery of the pad cover, as seen from the vehicle occupant side, and the switch assemblies constituted by pluralities of switches are arranged at positions at which operation through the pair of opening portions is possible.

In this case, in accordance with the present invention, because the pluralities of switches constituting the switch assemblies are arranged and shaped so as to be symmetrical with respect to the predetermined base lines crossing the opening portions, the left side switch assembly and the right side switch assembly become the same with respect to structure of parts. Accordingly, it is not necessary to independently prepare a metal mold for producing the left side switch assembly and a metal mold for producing the right side switch assembly, and one metal mold can be commonly employed. Further, in a case when control on the basis of signals from each of the switch assemblies is performed by independently arranged (separate)control units, it is possible to commonly use (to share the same) substrates installed within the switch assemblies.

In accordance with the second aspect of the present invention, since the switch assemblies mentioned above are fixed to the components that are steering wheel side constituting parts, it is possible to arrange the switch assembly without considering restriction from an opening shape of the opening portion (that is, a line of the opening portion). Accordingly, the present invention can be applied to various kinds of steering wheel.

In accordance with the third aspect of the present invention, since the switch assemblies mentioned above are fixed to the component that is one of pad cover side constituting parts, it is possible to generate a feeling of integration (to create integrated looks) between a design surface of the switch assemblies and a design surface of the pad cover.

DESCRIPTION OF THE PREFERRED EMBODIMENTS

[First Embodiment]

A description will be given below of a first embodiment in accordance with the present invention with reference to FIGS. 1 to 5.

Figure 1:
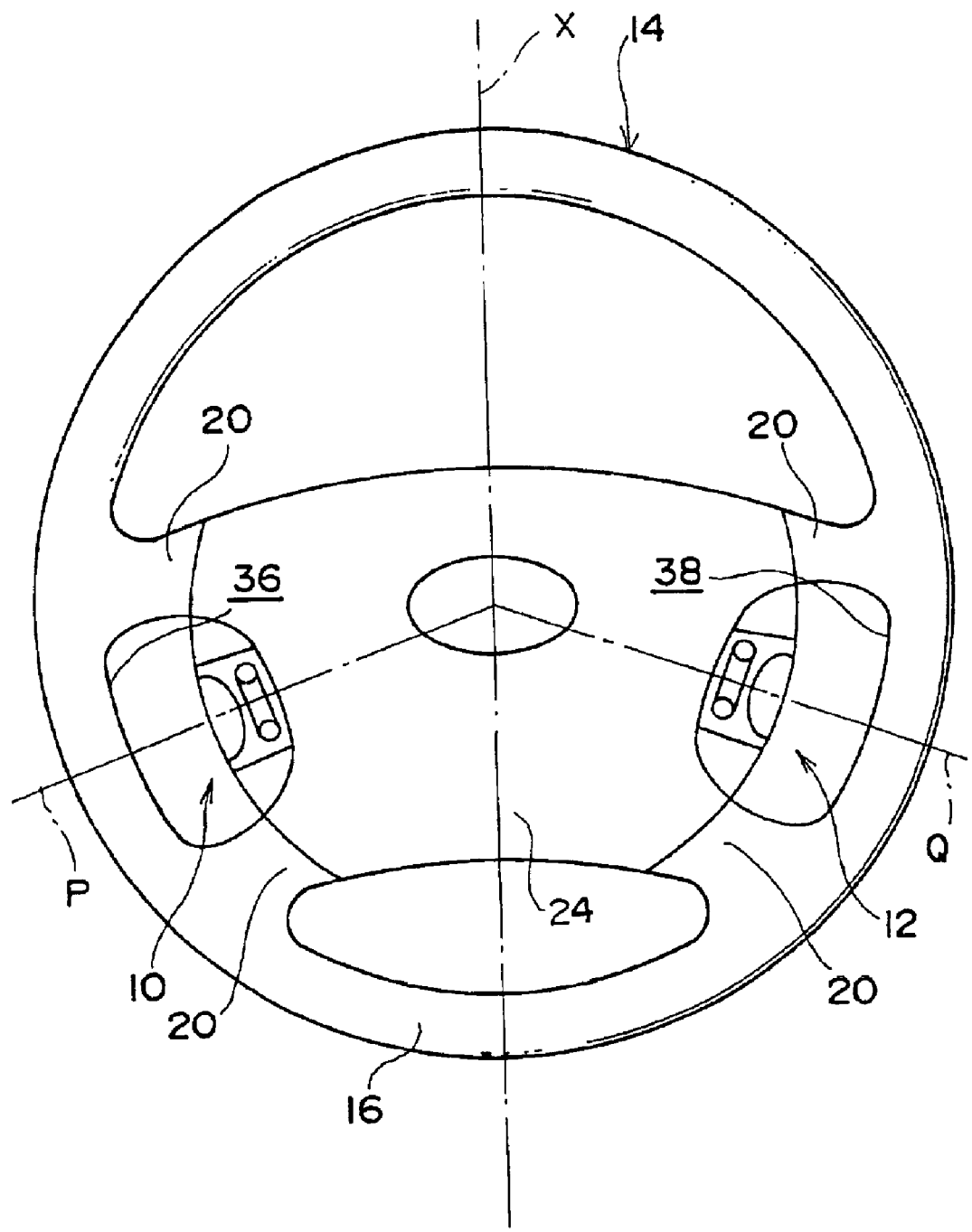
FIG. 1 is a front elevational view of an entire steering wheel provided with a steering switch for an audio device and a steering switch for a car navigation system in accordance with a first embodiment of the present invention.

In FIG. 1, there is shown a front elevational view of an entire steering wheel 14 provided with a first steering switch (assembly) 10 and a second steering switch (assembly) 12 in accordance with the present embodiment. Further, in FIG. 4, there is shown a perspective view showing a mounting structure of the first steering switch 10. As shown in these drawings, the steering wheel 14 is provided with a ring-like rim 16, a hub 18 fixed to a front end portion of a steering shaft (not shown) by a lock nut (not shown) and a core bar 22 constituted by four spokes 20 for connecting the rim 16 to the hub 18.

Figure 5:
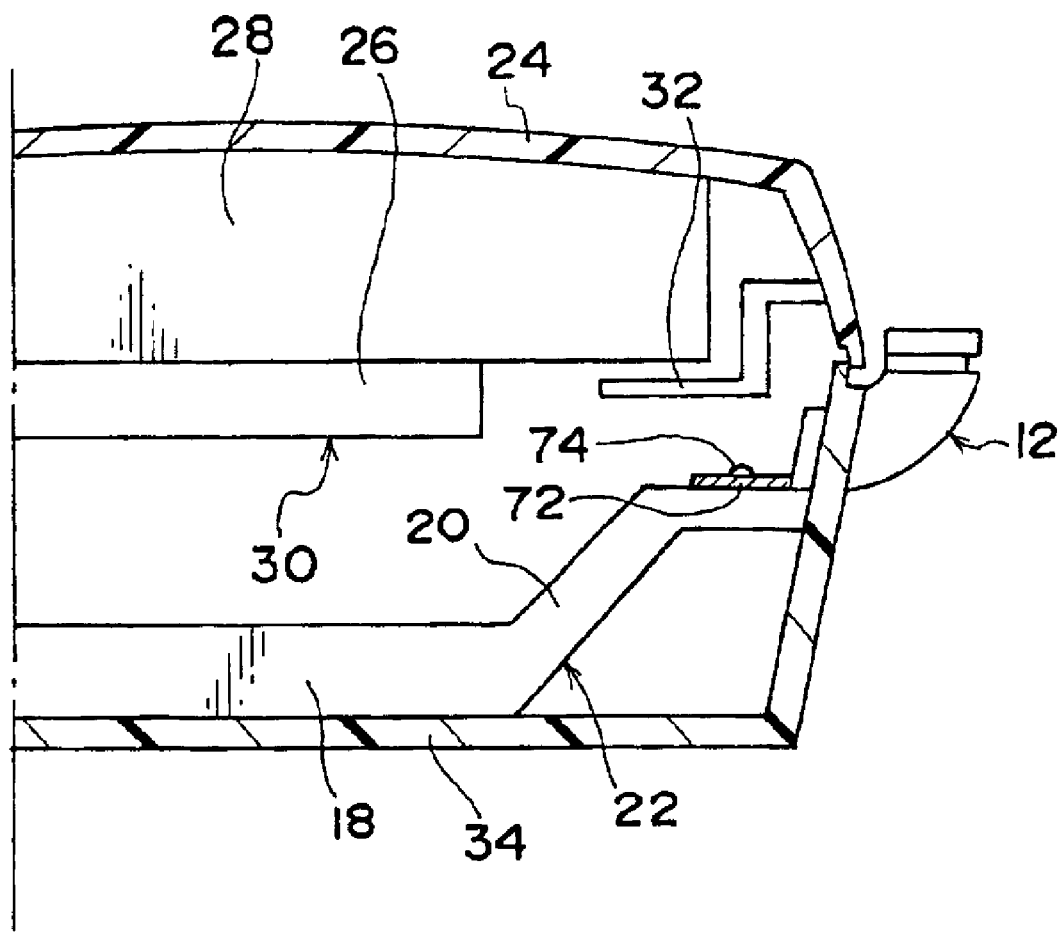
FIG. 5 is a schematic vertical cross sectional view of a mounting structure of the steering switch for the car navigation system shown in FIG. 1.

Further, a pad cover 24 for four spokes is arranged (provided) in a center portion of the rim 16 of the steering wheel 14. In this case, as shown in FIG. 5, an air bag apparatus 30 corresponding to a passenger protecting assisting apparatus expanding an air bag 28 due to a gas from an inflator 26 at a time when a vehicle rapidly decelerates so as to interpose the air bag 28 between the steering wheel 14 and an upper body of the passenger is arranged in a back surface side (in a side opposite to the passenger) of the pad cover 24, and a horn switch metal member 32 is further arranged thereon. Further, a lower side of the steering wheel 14 is covered by a lower cover 34.

As shown in FIGS. 1 to 4, a pair of opening portions 36 and 38 formed in a laterally symmetrical shape are provided between an inner peripheral edge of the rim 16 of the steering wheel 14 and an outer peripheral edge of the pad cover 24. The opening portions 36 and 38 are formed so as to be line symmetrical with respect to a central line X in FIG. 1. In more detail, the opening portion 36 corresponds to a portion surrounded by the inner peripheral edge of the rim 16 of the steering wheel 14, opposing edges of a pair of upper and lower spokes 20 positioned in a left side in FIG. 1 and the outer peripheral edge of the pad cover 24. The opening portion 36 corresponds to a portion surrounded by the inner peripheral edge of the rim 16 of the steering wheel 14, opposing edges of a pair of upper and lower spokes 20 positioned in a left side in FIG. 1 and the outer peripheral edge of the pad cover 24. The opening portion 38 corresponds to a portion formed in the similar manner to that mentioned above. Among them, the first steering switch 10 corresponding to "a switch assembly" is arranged (provided) in the left opening portion 36. Further, the second steering switch 12 corresponding to "a switch assembly" is arranged (provided) in the right opening portion 38.

Figure 2:
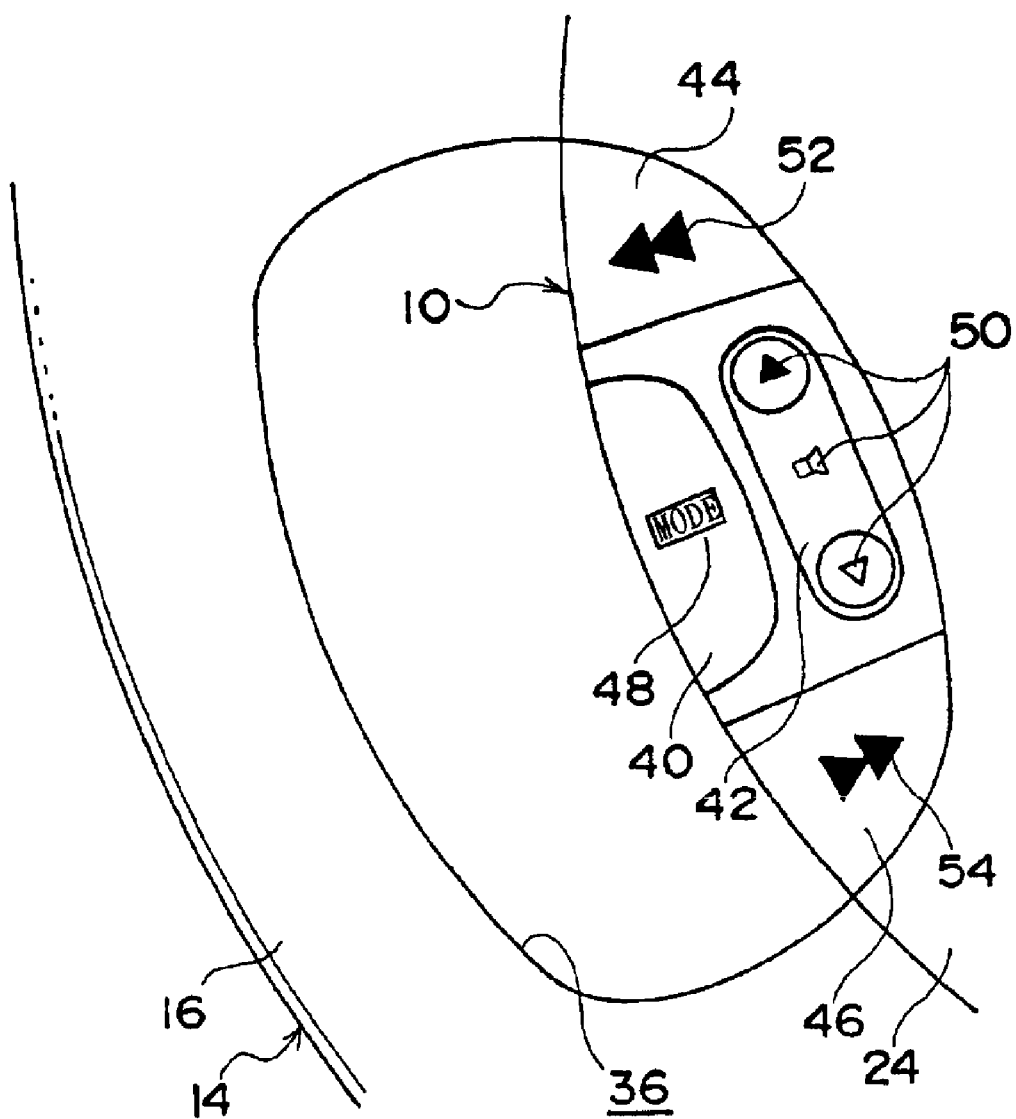
FIG. 2 is an enlarged front elevational view of a main portion including the steering switch for the audio device shown in FIG. 1.

As shown in FIG. 2, the first steering switch 10 is constituted by including a first switch 40 arranged in an outer side of a center portion (in a side of the rim 16), a second switch 42 arranged in an inner side of the center portion (in a side of the pad cover 24), a third switch 44 arranged in an upper portion and a fourth switch 46 arranged in a lower portion. In this case, in accordance with the present embodiment, since the first steering switch 10 is used as a steering switch for an audio device, a mode selecting display 48 meaning a switch for selecting a radio mode, a CD mode, a MD mode, a cassette tape mode and the like is attached to a surface of the first switch 40, a sound volume adjusting display 50 meaning a switch for adjusting a volume is attached to a surface of the second switch 42, a regular moving sequence display 52 meaning a switch used at a time of tuning or the like is attached to a surface of the third switch 44, and a reverse moving sequence display 54 meaning a switch used at a time of tuning or the like is attached to a surface of the fourth switch 46. The mode selecting display 48, the sound volume adjusting display 50, the regular moving sequence display 52 and the reverse moving sequence display 54 are, for example, constituted by a display member such as a seal or the like, and are fixed to the surfaces of the respective switches due to an adhesive force. Further, these first switch 40 to the fourth switch 46 are connected to a circuit board (not shown) arranged within the first steering switch 10, and the circuit board is further connected a controller (a control unit) (not shown) arranged in an outside of the first steering switch 10.

Figure 3:
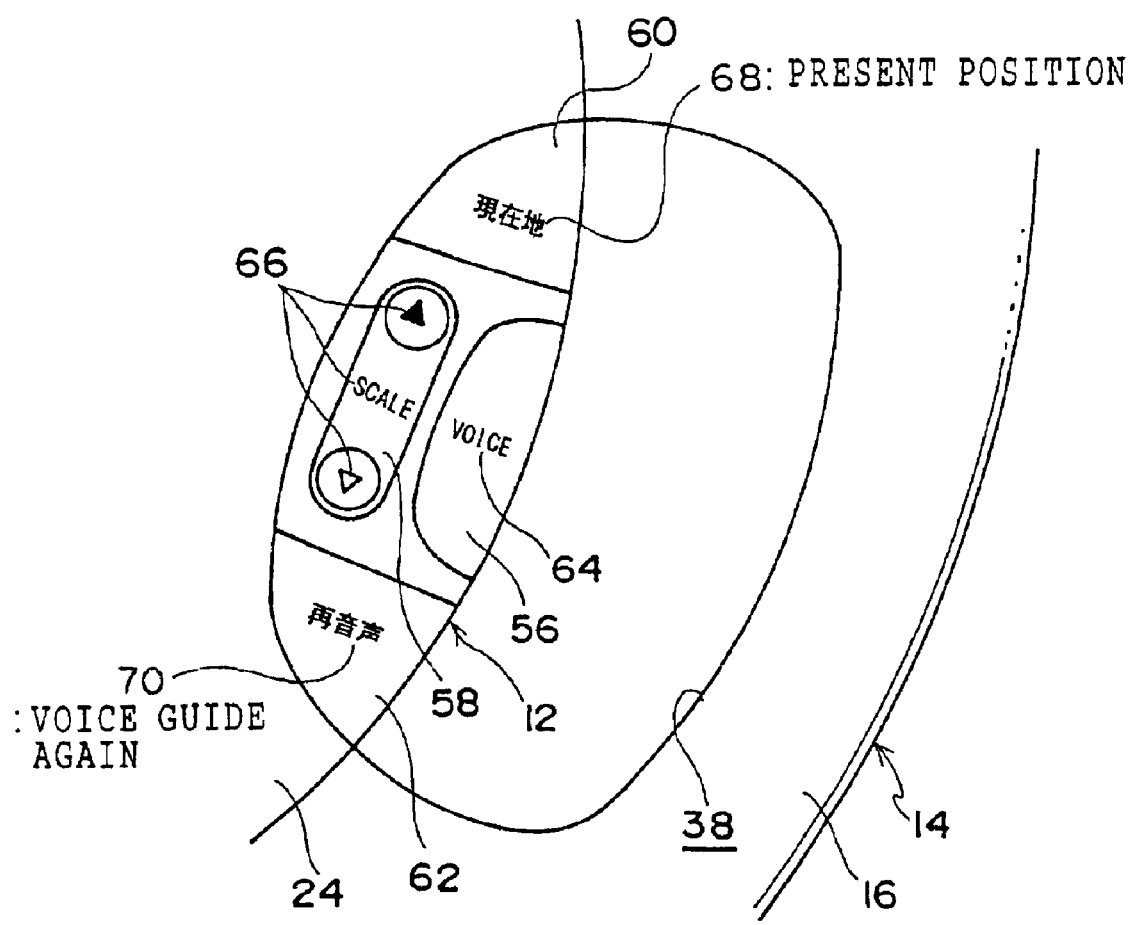
FIG. 3 is an enlarged front elevational view of a main portion including the steering switch for the car navigation system shown in FIG. 1.

On the contrary, as shown in FIG. 3, the second steering switch 12 is constituted by including a first switch 56 arranged in an outer side of a center portion (in a side of the rim 16), a second switch 58 arranged in an inner side of the center portion (in a side of the pad cover 24), a third switch 60 arranged in an upper portion and a fourth switch 62 arranged in a lower portion. In this case, in accordance with the present embodiment, since the second steering switch 12 is used as a steering switch for a car navigation system, a voice display 64 meaning a switch used at a time of inputting a voice is attached to a surface of the first switch 56, a scale display 66 meaning a switch for changing a display mode of a display device (not shown) to a wide area display mode or a detailed area display mode is attached to a surface of the second switch 58, a present position display 68 meaning a switch for, in the case of that a displayed image on the displayed device is scrolled, returning the scrolled image to an image before being scrolled (an original image) is attached to a surface of the third switch 60, and a reproduced voice display (voice guide again display) 70 meaning a switch used at a time of failing to hear a voice guide from the car navigation system is attached to a surface of the fourth switch 62. The voice display 64, the scale display 66, the present position display 68 and the reproduced voice display 70 are constituted by a display member such as a seal or the like, and are fixed to the surfaces of the respective switches due to an adhesive force. Further, these first switch 56 to the fourth switch 62 are connected to a circuit board (not shown) arranged within the second steering switch 12, and the circuit board is further connected a controller (a control unit) (not shown) arranged in an outside of the first steering switch 12.

In this case, in accordance with the present embodiment, a layout (an arrangement) of each of the switches and a shape of each of the switches are determined so that the first switch 40 to the fourth switch 46 in the first steering switch 10 mentioned above are line symmetrical with respect to a radial base line P (refer to FIG. 1) in the steering wheel 14 (in particular, the third switch 44 and the fourth switch 46 formed in the same shape as that of the third switch 44 are line symmetrical with respect to the radial base line P (refer to FIG. 1), and further, in accordance with the present embodiment, the first switch 40 is line symmetrical with respect to the radial base line P and the second switch 40 is line symmetrical with respect to the radial base line P). In the same manner, a layout (an arrangement) of each of the switches and a shape of each of the switches are determined so that the first switch 56 to the fourth switch 62 in the second steering switch 12 mentioned above are line symmetrical with respect to a radial base line Q (refer to FIG. 1) in the steering wheel 14 (in particular, the third switch 60 and the fourth switch 62 formed in the same shape as that of the third switch 60 are line symmetrical with respect to the radial base line Q (refer to FIG. 1), and further, in accordance with the present embodiment, the first switch 56 is line symmetrical with respect to the radial base line Q and the second switch 58 is line symmetrical with respect to the radial base line Q). In this case, the radial base lines P and Q form a predetermined angle in the steering wheel 14, as shown in FIG. 1.

Further, the first switch of the first steering switch 10 and the first switch of the second steering switch 12 are formed in the same shape, and in the same manner, the second, third and fourth switches of the first steering switch 10 and the second, third and fourth switches of the second steering switch 12 are formed in the same shape.

Accordingly, in the case of rotating the steering wheel 14 by a predetermined angle, the third switch 44 of the first steering switch 10 enters into a position of the fourth switch 62 of the second steering switch 12 (before the rotation), and the fourth switch 46 of the first steering switch 10 enters into a position of the third switch 60 of the second steering switch 12 (before the rotation). In this case, each of the radial base lines P and Q in the above description correspond to "predetermined base line crossing the opening portion" in the present invention.

Figure 4:
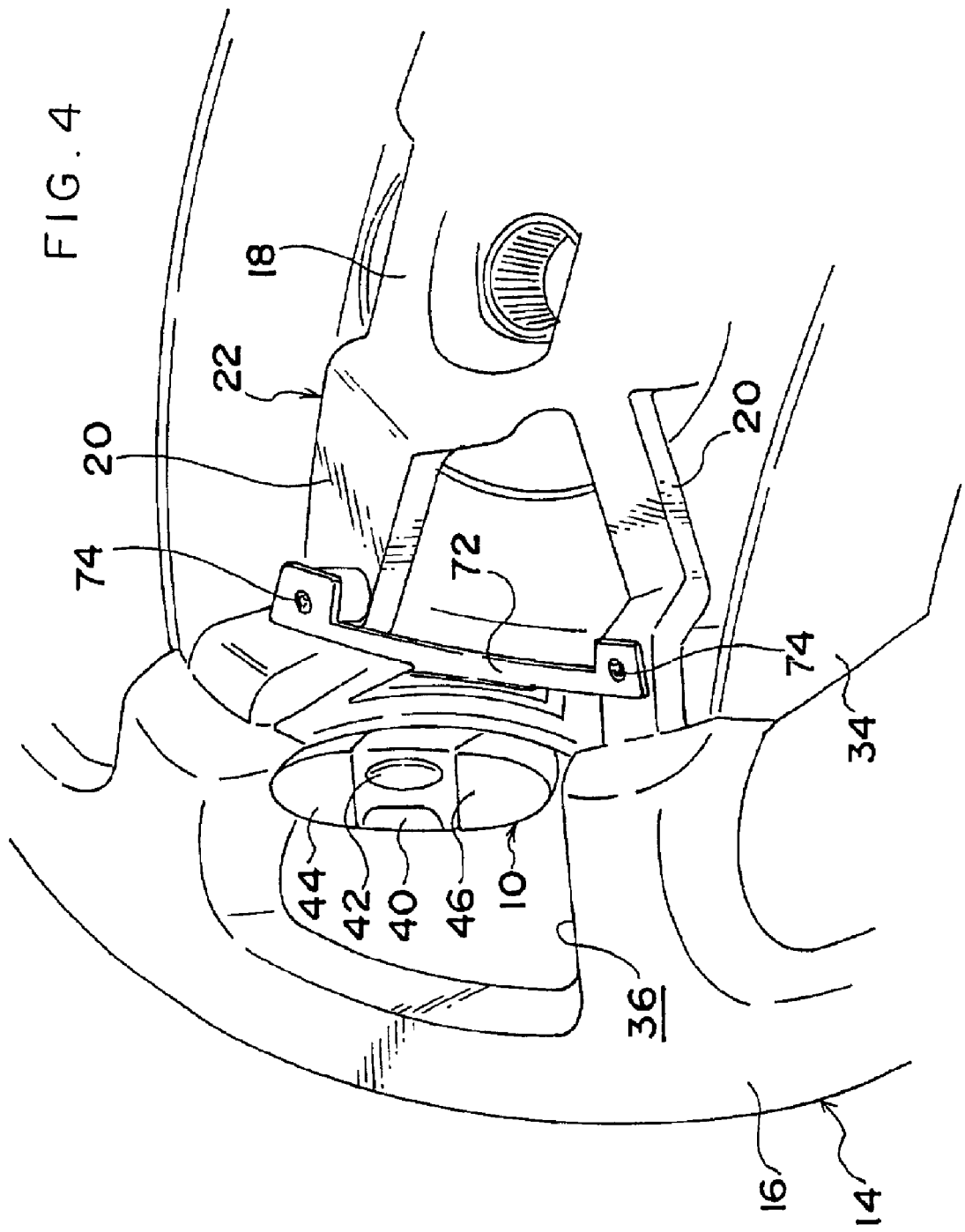
FIG. 4 is a perspective view showing a mounting structure of the steering switch for the audio device shown in FIG. 1.

Further, as shown in FIGS. 4 and 5, the first steering switch 10 mentioned above is fixed to a core bar 22 of the steering wheel 14. In particular, a mounting member 72 is fixed to each of the spokes 20 corresponding to a pair of right and left "steering wheel side constituting parts" of the steering wheel 14 by a screw 74, and each of the first steering switch 10 and the second steering switch 12 is fixed to an upper end portion of each of the mounting members 72. Accordingly, the first steering switch 10 and the second steering switch 12 are actually mounted at a position slightly lower than the pad cover 24.

Next, a description will be give of an operation and an effect of the present embodiment.

In the present embodiment, a pair of opening portions 36 and 38 formed in a laterally symmetrical shape are formed between the inner peripheral edge of the rim 16 of the steering wheel 14 and the outer peripheral edge of the pad cover 24 as seen from the passenger side, the first steering switch 10 is arranged in the opening portion 36 positioned at a left side in a standstill state (in a neutral state of the steering wheel 14), and the second steering switch 12 is arranged in the opening portion 38 positioned at a right side in the standstill state (in the neutral state of the steering wheel 14).

In this case, in accordance with the present embodiment, a layout of each of the switches and a shape of each of the switches are determined so that the first switch 40 to the fourth switch 46 in the first steering switch 10 mentioned above are line symmetrical with respect to a radial base line P (refer to FIG. 1) in the steering wheel 14 (in particular, the third switch 44 and the fourth switch 46 formed in the same shape as that of the third switch 44 are line symmetrical with respect to the radial base line P (refer to FIG. 1), and further, in accordance with the present embodiment, the first switch 40 is line symmetrical with respect to the radial base line P and the second switch 40 is line symmetrical with respect to the radial base line P). In the same manner, a layout of each of the switches and a shape of each of the switches are determined so that the first switch 56 to the fourth switch 62 in the second steering switch 12 mentioned above are line symmetrical with respect to a radial base line Q (refer to FIG. 1) in the steering wheel 14 (in particular, the third switch 60 and the fourth switch 62 formed in the same shape as that of the third switch 60 are line symmetrical with respect to the radial base line Q (refer to FIG. 1), and further, in accordance with the present embodiment, the first switch 56 is line symmetrical with respect to the radial base line Q and the second switch 58 is line symmetrical with respect to the radial base line Q). In this case, the radial base lines P and Q form a predetermined angle in the steering wheel 14, as shown in FIG. 1.

Further, the first switch of the first steering switch 10 and the first switch of the second steering switch 12 are formed in the same shape, and in the same manner, the second, third and fourth switches of the first steering switch 10 and the second, third and fourth switches of the second steering switch 12 are formed in the same shape.

Accordingly, the first steering switch 10 arranged in the left opening portion 36 and the second steering switch 12 arranged in the right opening portion 38 become the same in view of the parts structure, and the difference between the first steering switch 10 and the second steering switch 12 exists in the matter that the display seals of the steering switch for the audio device are adhered to the respective switches or the display seals of the steering switch for the car navigation system are adhered to the respective switches. Accordingly, it is unnecessary to independently prepare the metal mold for producing the first steering switch 10 in the left side and the metal mold for producing the second steering switch 12 in the right side, and one kind of metal mold can be commonly used in producing the first and second steering switches 10 and 12. Further, in the case of controlling on the basis of the signals from the first steering switch 10 and the second steering switch 12 by means of an independently arranged control unit, it is possible to make the circuit boards installed within the first steering switch 10 and the second steering switch 12 common. As a result, in accordance with the present embodiment, it is possible to reduce a number of kinds of the parts and widely reduce a cost therefor.

Further, in accordance with the present embodiment, since each of the first steering switch 10 and the second steering switch 12 is mounted to the respective spokes 20 of the core bar 22 in the steering wheel 14 via the mounting member 72, it is possible to arrange the first steering switch 10 and the second steering switch 12 without being restricted by the shape of the opening portions 36 and 38 (that is, the line of the opening portions 36 and 38). Therefore, the first steering switch 10 and the second steering switch 12 in accordance with the present embodiment can be applied to various kinds of steering wheel. As a result, in accordance with the present embodiment, it is possible to increase a wide use property of the first steering switch 10 and the second steering switch 12.

[Second Embodiment]

Next, a description will be given of a second embodiment in accordance with the present invention with reference to FIGS. 6 to 10. In this case, the same reference numerals are attached to the same elements as those of the first embodiment mentioned above and a description thereof will be omitted.

In accordance with the present embodiment, the structure is basically made in the same manner as that of the first embodiment mentioned above. That is, a first steering switch 84 and a second steering switch 86 which correspond to "switch assembly" are respectively arranged in a pair of opening portions 80 and 82 formed in a laterally symmetrical shape in the steering wheel 14, and a layout and a shape of the first steering switch 84 and the second steering switch 86 are determined so as to be line symmetrical with respect to the radial base lines P and Q (refer to FIG. 6) in the steering wheel 14. In this case, the structure in accordance with the present embodiment is different from the first embodiment mentioned above in view that a second switch 88 (refer to FIG. 7) in the first steering switch 84 and a second switch 90 (refer to FIG. 8) in the second steering switch 86 are dial type switches.

Figure 9:
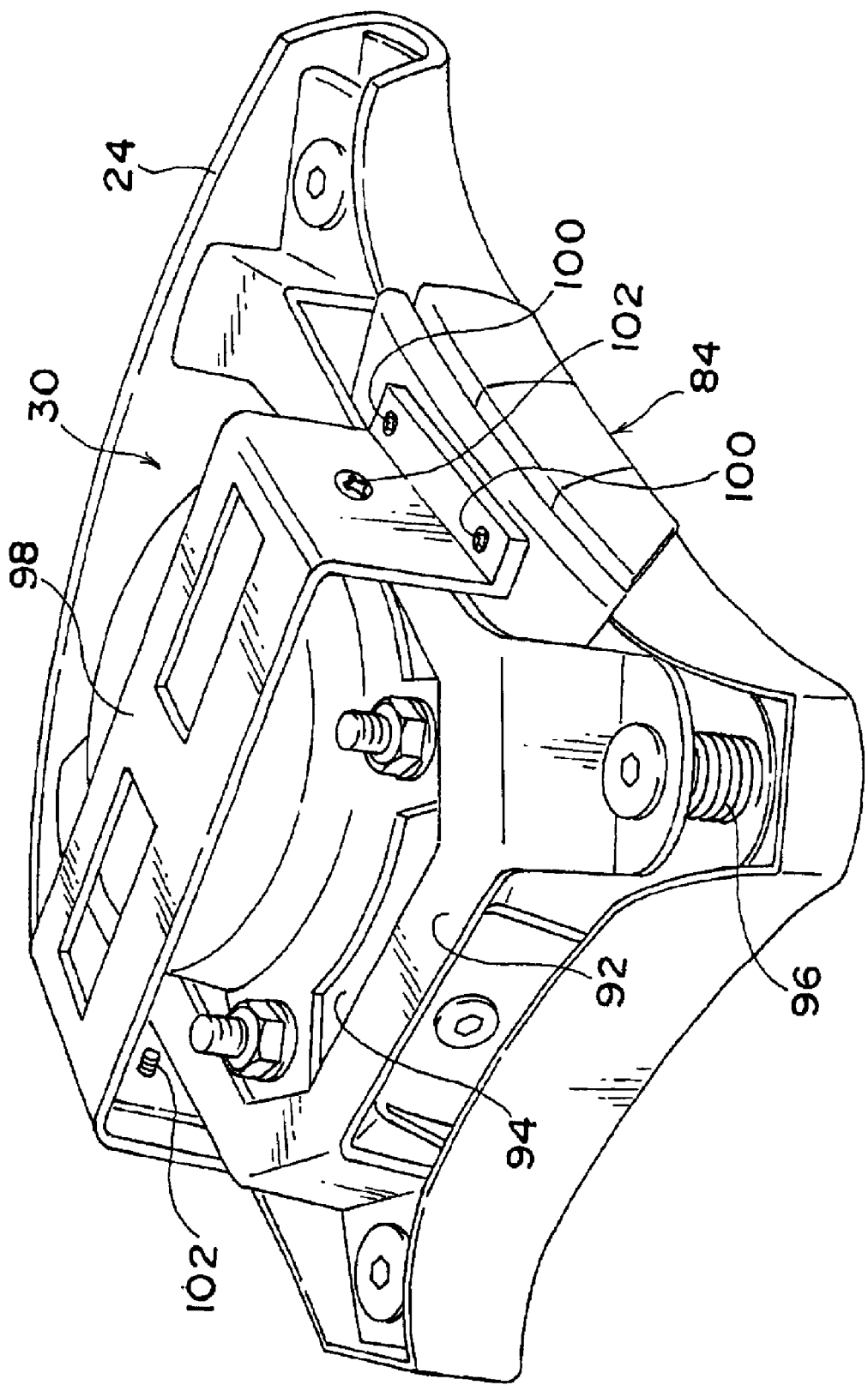
FIG. 9 is a perspective view showing a mounting structure of the steering switch for the audio device shown in FIG. 6.
Figure 10:
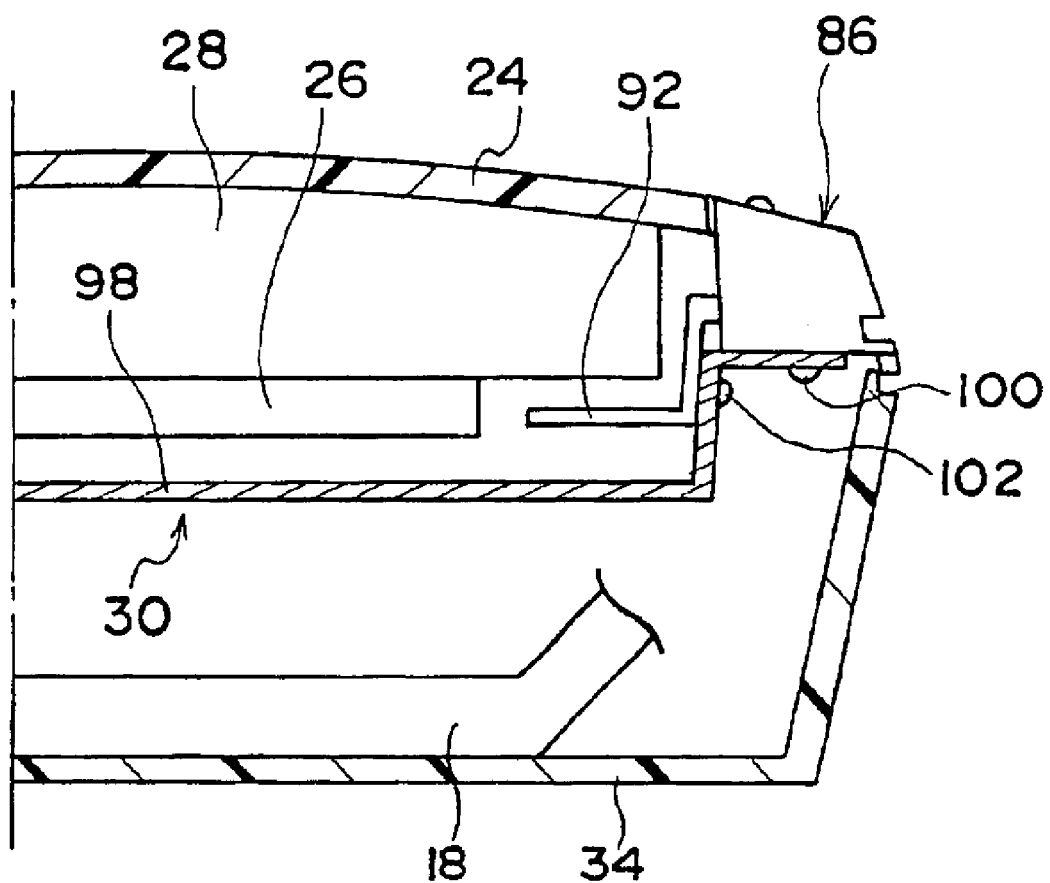
FIG. 10 is a schematic vertical cross sectional view of a mounting structure of the steering switch for the car navigation system shown in FIG. 6.

Further, as shown in FIGS. 9 and 10, the structure in accordance with the present embodiment is different from the first embodiment mentioned above in view that the first steering switch 84 and the second steering switch 86 are fixed to a pad side floating horn metal member 92 corresponding to "pad cover side constituting part". In particular, the pad side floating horn metal member 92 supported in a floating manner by a spring 96 so as to cover a base plate 94 is arranged in the periphery of the base plate 94 to which the inflator 26 and the air bag 28 are fixed. On the contrary, the first steering switch 84 and the second steering switch 86 are fixed to both end portions of a mounting member 98 having a hat-shaped cross section by screws 100. Then, both side portions of the mounting member 98 are fixed to the pad side floating horn metal member 92 by screws 102.

In accordance with the structure mentioned above, the same operations and effects as those of the first embodiment mentioned above can be also obtained. That is, the first steering switch 84 and the second steering switch 86 are arranged in a pair of opening portions 80 and 82 formed in a laterally symmetrical shape in the steering wheel 14.

Figure 6:
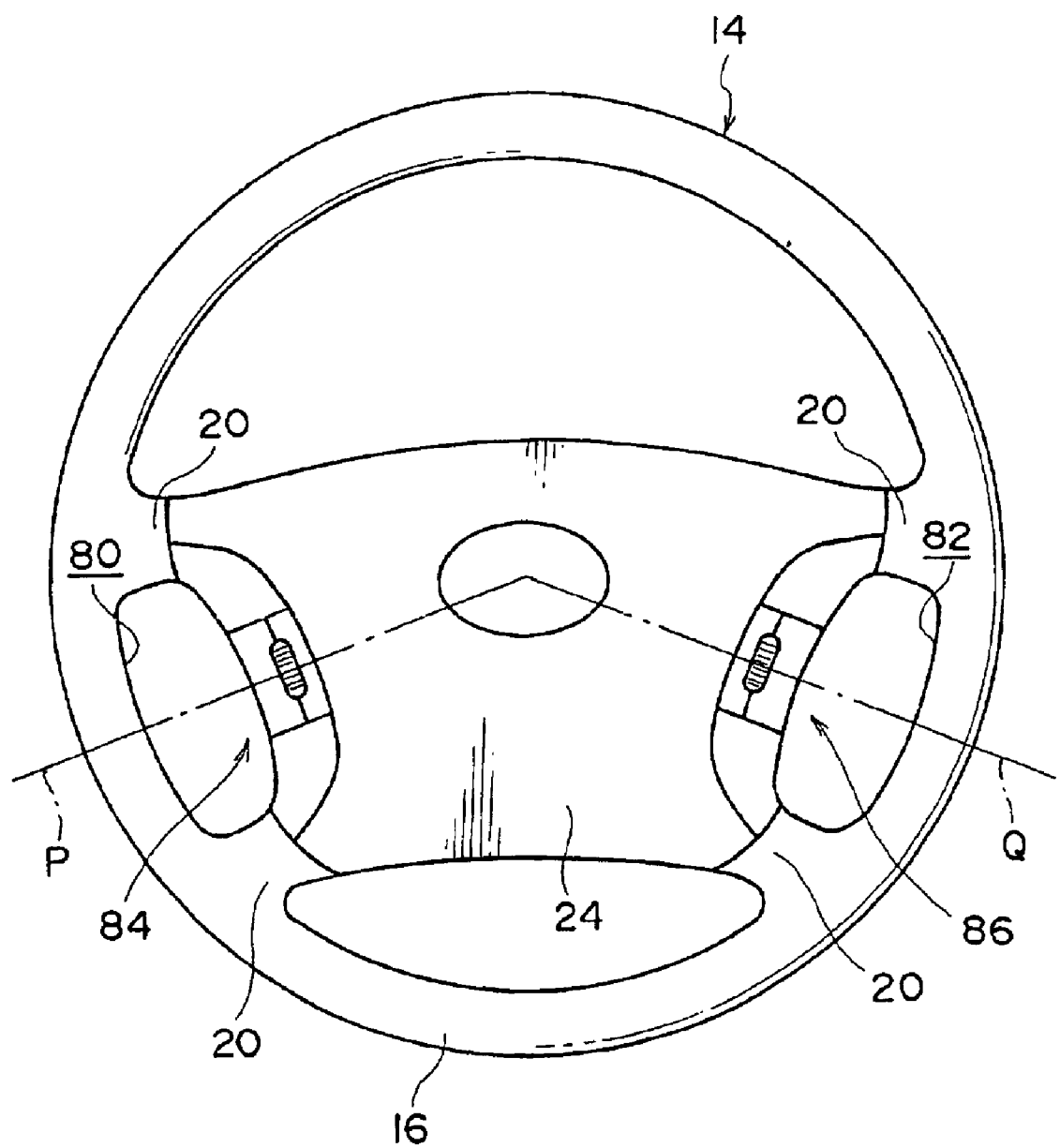
FIG. 6 is a front elevational view of an entire steering wheel provided with a steering switch for an audio device and a steering switch for a car navigation system in accordance with a second embodiment of the present invention.
Figure 7:
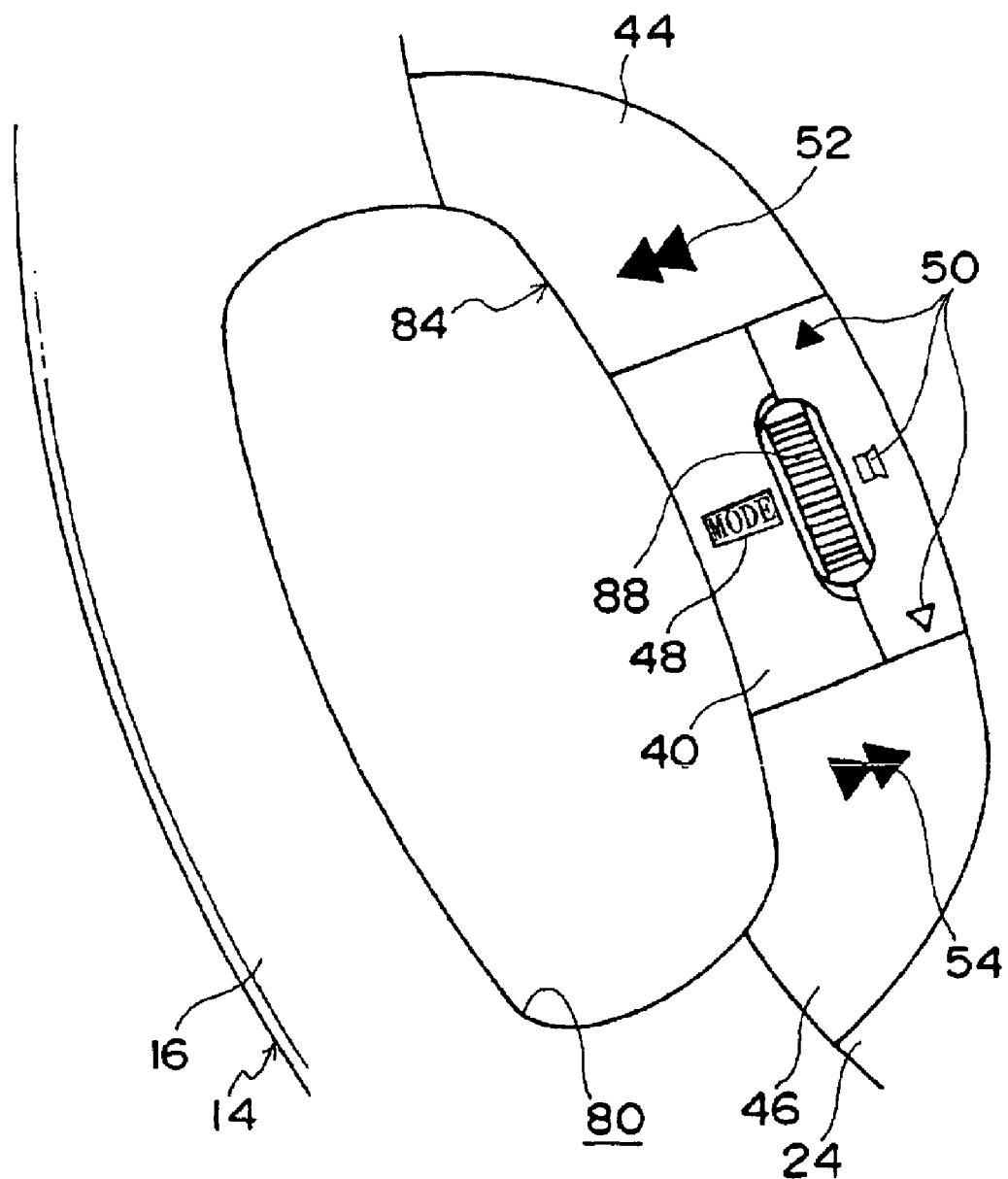
FIG. 7 is an enlarged front elevational view of a main portion including the steering switch for the audio device shown in FIG. 6.
Figure 8:
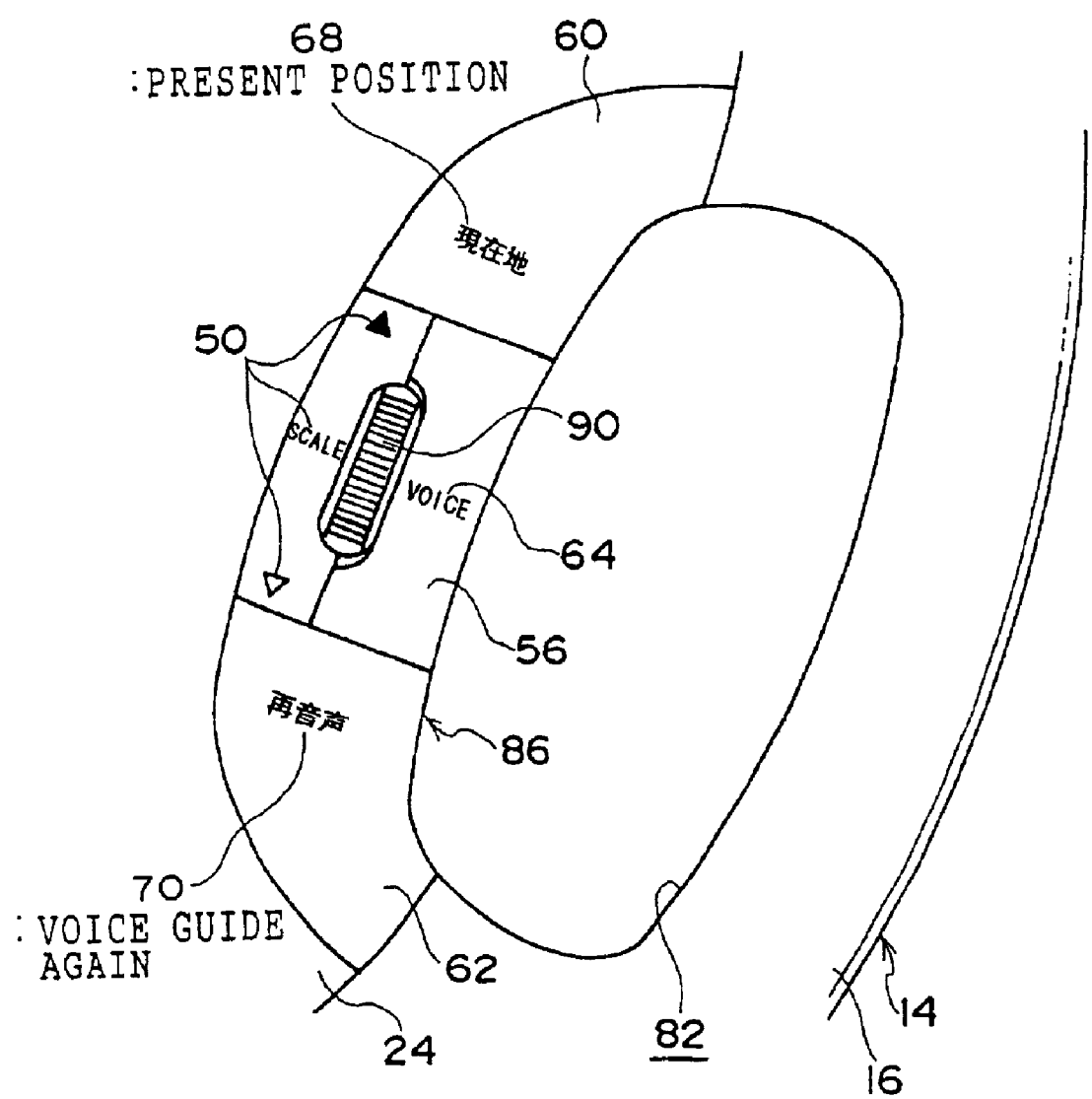
FIG. 8 is an enlarged front elevational view of a main portion including the steering switch for the car navigation system shown in FIG. 6.

In this case, in accordance with the present embodiment, in the same manner as that of the first embodiment, a layout of each of the switches and a shape of each of the switches are determined so that the first to fourth switches 40, 88, 44 and 46 in the first steering switch 84 mentioned above are line symmetrical with respect to a radial base line P (refer to FIG. 6) in the steering wheel 14. In the same manner, a layout of each of the switches and a shape of each of the switches are determined so that the first to fourth switches 56, 90, 60 and 62 in the second steering switch 86 mentioned above are line symmetrical with respect to a radial base line Q (refer to FIG. 6) in the steering wheel 14. In this case, the radial base lines P and Q form a predetermined angle in the steering wheel 14, as shown in FIG. 6.

Further, the first switch of the first steering switch 84 and the first switch of the second steering switch 86 are formed in the same shape, and in the same manner, the second, third and fourth switches of the first steering switch 84 and the second, third and fourth switches of the second steering switch 86 are formed in the same shape.

Accordingly, the first steering switch 84 arranged in the left opening portion 80 and the second steering switch 86 arranged in the right opening portion 82 become the same in view of the parts structure, and the difference between the first steering switch 84 and the second steering switch 86 exists only in the matter that the display seals of the steering switch for the audio device are adhered to the respective switches or the display seals of the steering switch for the car navigation system are adhered to the respective switches. Accordingly, it is unnecessary to independently prepare the metal mold for producing the first steering switch 84 in the left side and the metal mold for producing the second steering switch 86 in the right side, and one kind of metal mold can be commonly used in producing the first and second steering switches 84 and 86. Further, in the case of controlling on the basis of the signals from the first steering switch 84 and the second steering switch 86 by means of an independently arranged control unit, it is possible to make the circuit boards installed within the first steering switch 84 and the second steering switch 86 common. As a result, in accordance with the present embodiment, it is possible to reduce a number of kinds of the parts and widely reduce a cost therefor.

Further, in accordance with the present embodiment, since each of the first steering switch 84 and the second steering switch 86 is fixed to the pad side floating horn metal member 92 corresponding to the pad cover side constituting part via the mounting member 98, it is possible to generate an integral feeling between design surfaces of the first steering switch 84 and the second steering switch 86 and a design surface of the pad cover 24. As a result, in accordance with the present embodiment, it is possible to significantly improve a design property (a design value) of the steering wheel 14.

In this case, in the first embodiment and the second embodiment mentioned above, the description is given of the structure in which the first steering switches 10 and 84 are employed for the steering switch for the audio device and the second steering switches 12 and 86 are employed for the steering switch for the car navigation system, however, a subject to which each of the switches is applied is not limited to this, and the respective switches can be used for various kinds of usage. For example, the switches can be sufficiently used for a car air conditioner.

Further, in the first embodiment mentioned above, each of the first steering switch 10 and the second steering switch 12 is fixed to each of the spokes 20 corresponding to the steering wheel side constituting part via the mounting member 72, however, a subject (member) to be fixed is not limited to the spokes 20, and anything as far as being recognized as a part in the steering wheel 14 side may be employed. In the same manner, in the second embodiment mentioned above, the first steering switch 84 and the second steering switch 86 are fixed to the pad side floating horn metal fitting 92 corresponding to the pad cover side constituting part via the mounting member 98, however, a subject (member) to be fixed is not limited to the pad side floating horn metal member 92, and anything as far as being recognized as a part in the pad cover 24 side may be employed.

As mentioned above, in the switch structure of the steering wheel in accordance with the present invention, since the arrangement and the shape of a plurality of switches constituting the switch assembly are determined so as to be line symmetrical with respect to the predetermined base line intersecting the opening portion of the steering wheel, it is possible to commonly use one metal mold and substrate, so that there can be obtained an excellent effect that the number of kind of the parts can be reduced and the cost can be widely reduced.

Further, in the switch structure of the steering wheel in accordance with the present invention, since the switch assembly mentioned above is fixed to one of the steering wheel side constituting parts, the switch assembly is not restricted by the shape of the opening portion, so that there can be obtained an excellent effect that the common use property can be increased.

Further, in the switch structure of the steering wheel in accordance with the present invention, since the switch assembly mentioned above is fixed to one of the pad cover side constituting parts, it is possible to generate an integral feeling between the design surface of the switch assembly and the design surface of the pad cover, so that there can be obtained an excellent effect that the design property (the design value) of the steering wheel can be significantly improved.

Figure 11:
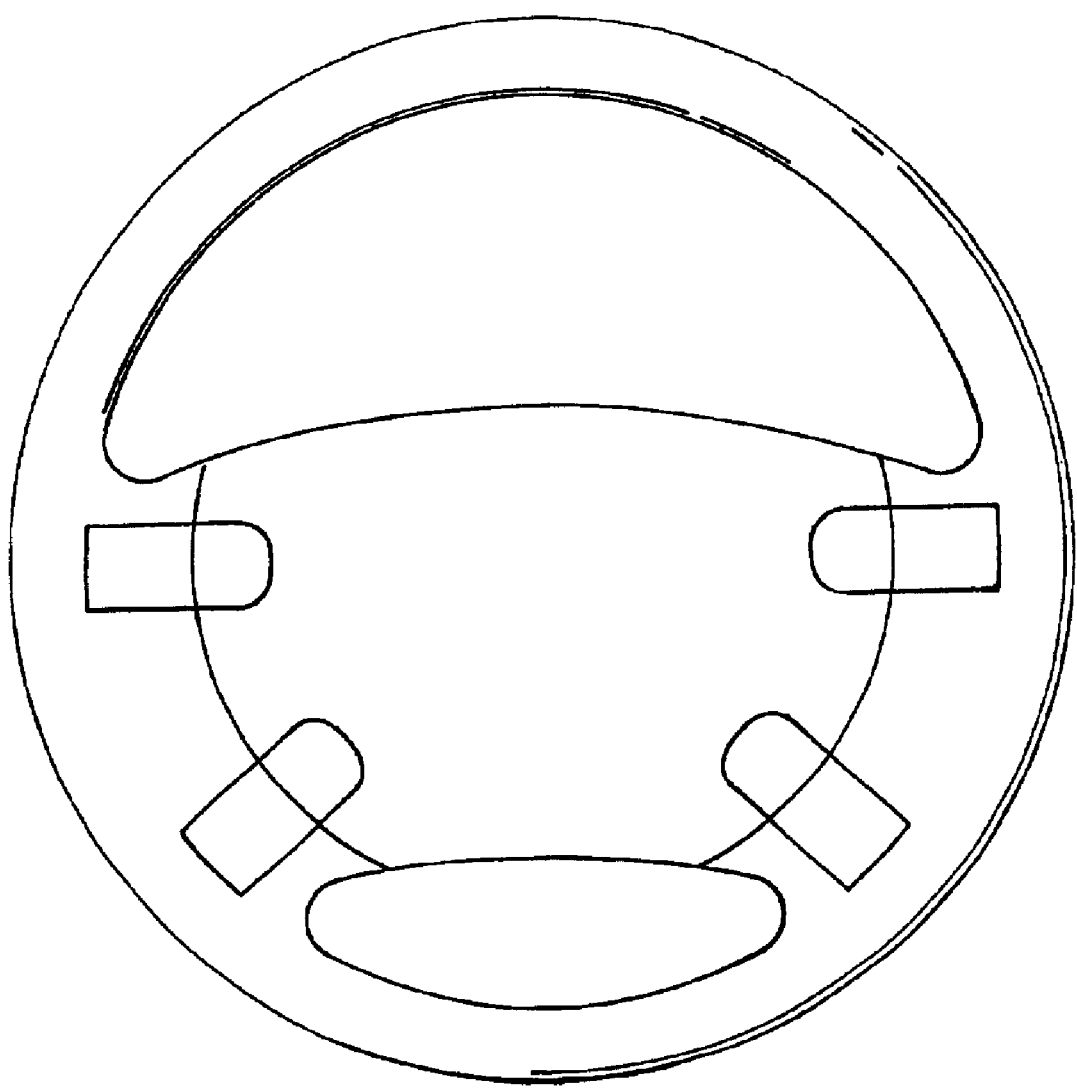
FIG. 11 is a front elevational view of an entire steering wheel provided with steering switches in accordance with another embodiment of the present invention.
Figure 12:
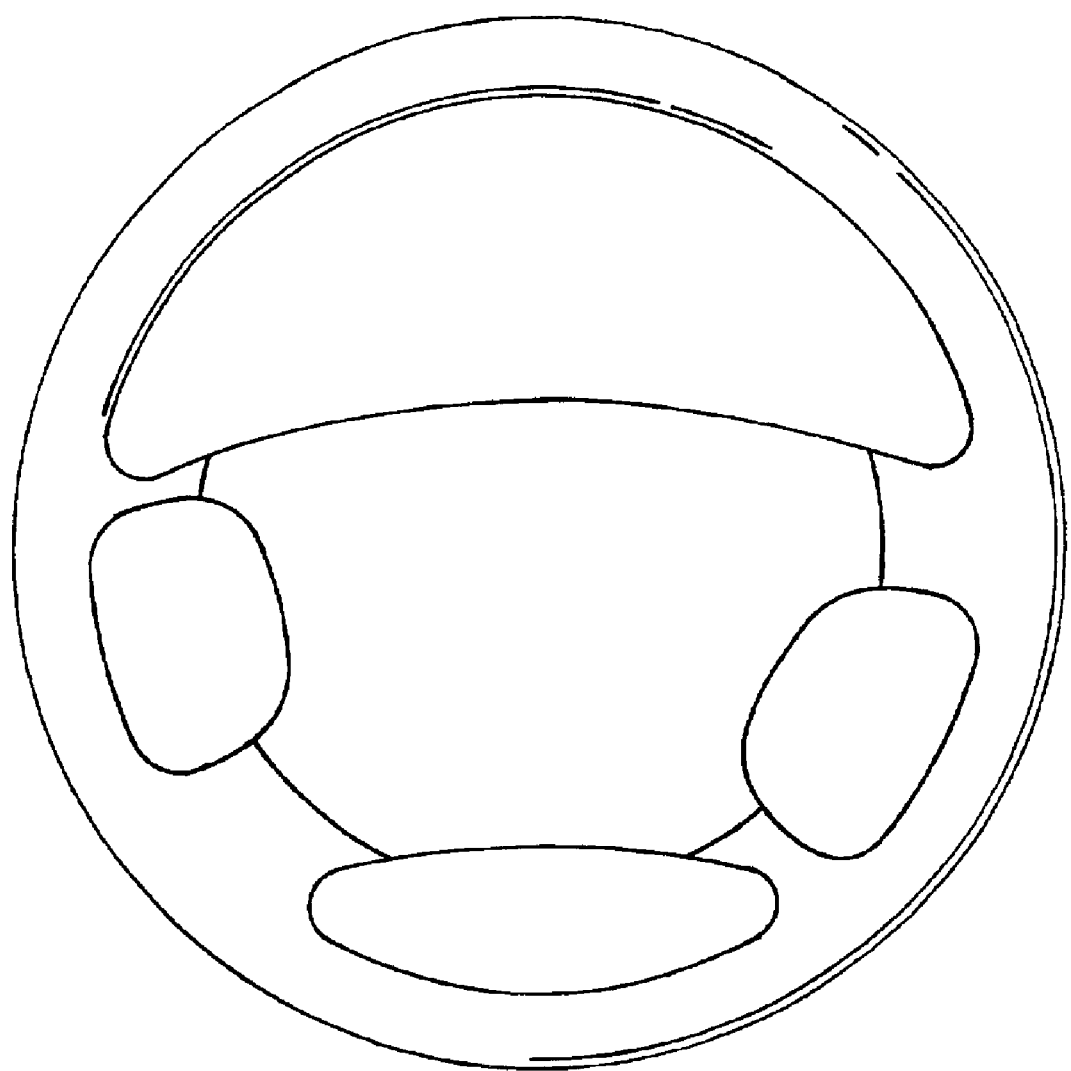
FIG. 12 is a front elevational view of an entire steering wheel provided with steering switches in accordance with another embodiment of the present invention.
Figure 13:
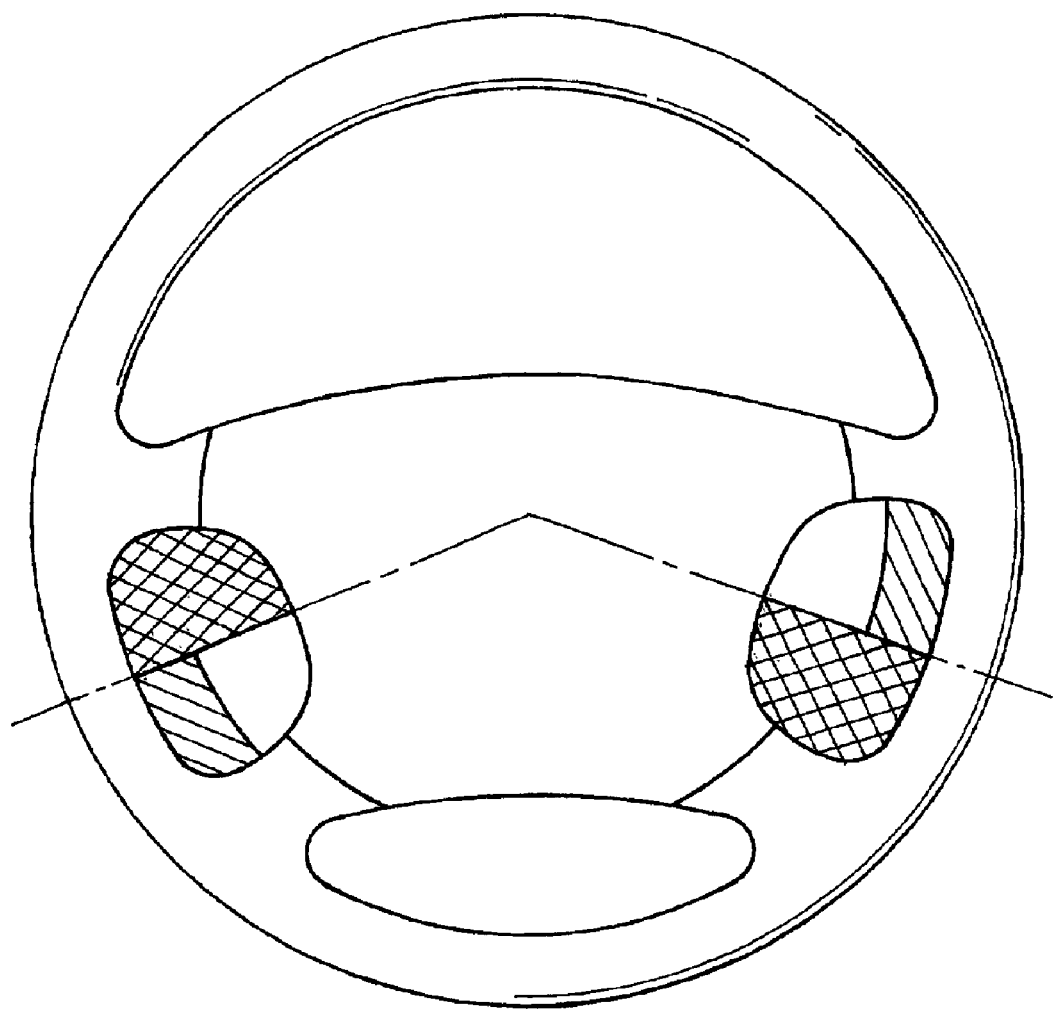
FIG. 13 is a front elevational view of an entire steering wheel provided with steering switches in accordance with another embodiment of the present invention.

Further, the present invention is not limited to the above mentioned embodiments. The present invention also includes a switch structure of a steering wheel at which opening portions are formed in the steering wheel, at each of which opening portions a switch assembly constituted by a plurality of switches is disposed, wherein arrangement of the plurality of switches is the same at each switch assembly, and a switch disposed at corresponding portion of each switch assembly has the same shape at each switch assembly. For example, FIG. 11 shows a switch structure of a steering wheel at which three or more (for example, four) opening portions are formed between an inner periphery of a rim of the steering wheel and an outer periphery of a pad cover of the steering wheel as seen from a vehicle occupant side, at each of which opening portions a switch assembly constituted by a plurality of switches is disposed. FIG. 12 shows a switch structure of a steering wheel at which opening portions are formed, which opining portions are not symmetrically formed, between an inner periphery of a rim of the steering wheel and an outer periphery of a pad cover of the steering wheel as seen from a vehicle occupant side, at each of which opening portions a switch assembly constituted by a plurality of switches is disposed. FIG. 13 show a switch structure of a steering wheel at which opening portions are formed between an inner periphery of a rim of the steering wheel and an outer periphery of a pad cover of the steering wheel as seen from a vehicle occupant side, at each of which opening portions a switch assembly constituted by a plurality of switches is disposed, wherein a one opening portion and another opening portion formed between the inner periphery of the rim and the outer periphery of the pad cover as seen from the vehicle occupant; a one switch assembly constituted by a plurality of switches disposed in the one opening portion; and another switch assembly constituted by a plurality of switches disposed in the other opening portion, wherein an arrangement of the plurality of switches of the one switch assembly is the same as an arrangement of the plurality of switches of the other switch assembly, and each switch of the plurality of switches of the one switch assembly has a same shape with a shape of a switch of the plurality of switches of the other switch assembly which switch corresponds to the each switch of the plurality of switches of the one switch assembly.

In the switch structures of the steering wheel shown in FIGS. 11, 12 and 13, a number of types of parts can be reduced and cost can be greatly reduced.

What is claimed is:

1. A switch structure of a steering wheel at which a pair of opening portions are symmetrically formed between an inner perphery of a rim of the steering wheel and an outer periphery of a pad cover of the steering wheel, at each of the opening portions a switch assembly constituted by a plurality of switches is disposed, wherein an arrangement and a shape of the plurality of switches constituting the each switch assembly are determined so as to be symmetrical with respect to a radially-oriented base line bisecting each of the opening portions, and wherein each of said switch assemblies comprises an elongated body portion including an elongated mounting member offset from and extending away from said body portion in a radial direction toward said pad cover in a position substantially parallel with said elongated body portion, and having end portions adapted to be attached to spokes of said steering wheel.

2. A switch structure of a steering wheel according to claim 1, wherein the switch assembly is fixed to a component that is one of pad cover side constituting parts.

3. A switch structure of a steering wheel at which opening portion are positioned between an inner periphery of a rim of the steering wheel and an outer periphery of a pad cover of the steering wheel, at each of which opening portions a switch assembly constituted by a plurality of switches is disposed, wherein arrangement of the plurality of switches is the same at each switch assembly, and a switch disposed at corresponding portions of each switch assembly has the same shape at each switch assembly, and wherein each of said switch assemblies comprises an elongated body portion including an elongated mounting member offset from and extending away from said body portion in a radial direction toward said pad cover in a position substantially parallel with said elongated body portion, and having end portions adapted to be attached to spokes of said steering wheel.

4. A switch structure of a steering wheel according to claim 3 comprising;
a first opening portion and a second opening portion formed between the inner periphery of the rim and the outer periphery of the pad cover;
a first switch assembly constituted by a plurality of switches disposed in the first opening portion; and
a second switch assembly constituted by a plurality of switches disposed in the second opening portion,
wherein an arrangement of the plurality of switches of the first switch assembly is the same as an arrangement of the plurality of switches of the second switch assembly, and
each switch of the plurality of switches of the first switch assembly has a same shape with a shape of a switch of the plurality of switches of the second switch assembly which switch corresponds to the each switch of the plurality of switches of the first switch assembly, and
wherein each of said switch assemblies comprises an elongated body portion including an elongated mounting member offset from and extending away from said body portion in a radial direction toward said pad cover in a position substanially parallel with said elongated body portion, and having end portions adapted to be attached to spokes of said steering wheel.

5. A switch structure of a steering wheel according to claim 1, wherein said body portion of each of said switch assemblies has a bottom end that is laterally displaced away from said top side toward said pad cover.

\* \* \* \* \*